United States Patent [19]

Maher et al.

[11] 3,903,313

[45] Sept. 2, 1975

[54] METHOD FOR PREPARING MEAT AND VEGETABLE STICKS

[75] Inventors: Robert H. Maher; Fred W. Billerbeck, both of Fremont, Mich.

[73] Assignee: Gerber Products Company, Fremont, Mich.

[22] Filed: July 17, 1974

[21] Appl. No.: 489,298

Related U.S. Application Data

[63] Continuation-in-part of Ser. No. 457,047, April 1, 1974, abandoned.

[52] U.S. Cl. ............... 426/250; 426/311; 426/328; 426/364; 426/371; 426/382
[51] Int. Cl.² .................... A22C 18/00; A22C 21/00
[58] Field of Search ........... 426/105, 129, 149, 211, 426/212, 362, 364, 371, 372, 377, 378, 382, 509, 510, 250, 328, 311

[56] References Cited
UNITED STATES PATENTS

| | | | |
|---|---|---|---|
| 2,887,382 | 5/1959 | Rivoche | 426/371 X |
| 3,083,108 | 3/1963 | Kline et al. | 426/371 |
| 3,264,121 | 8/1966 | Juomy et al. | 426/362 |

*Primary Examiner*—Hyman Lord
*Attorney, Agent, or Firm*—Townsend and Townsend

[57] ABSTRACT

Method and product are provided comprising a meat and vegetable food product in the form of a small conveniently handled stick. The product is prepared by combining raw meat, usually frozen, which is blended and emulsified, followed by the addition of dehydrated vegetables. The resulting mixture is stuffed into a casing, and the encased mixture smoked and heated in a carefully moisture controlled environment. The casing is then removed and the sausage-like product linked or cut into convenient sizes. The resulting sticks are then packaged in containers containing water or a meat stock broth.

8 Claims, No Drawings

METHOD FOR PREPARING MEAT AND VEGETABLE STICKS

This application is a continuation-in-part application of copending patent application Ser. No. 457,047, filed Apr. 1, 1974 and entitled "Meat/Vegetable Sticks", now abandoned.

BACKGROUND OF THE INVENTION

1. Field of the Invention

In preparing combinations of meat and vegetables in ready-to-eat form, there are many concerns in retaining organoleptic properties. With junior foods, a particularly desirable combination of meat and vegetables is in the form of a cooked readily digestible stick. The stick or bar is convenient for a number of reasons. First, the meat and vegetables can be eaten manually, avoiding the need for utensils. Secondly, the food is in readily accessible form, so that the child need not be restricted to mealtimes when receiving nutrition. Thirdly, the stick provides a reasonable alternative to sweets, which have a number of undesirable attributes. Also, the meat and vegetables in stick form can be eaten in such a manner that the child remains neat and the child's clothes substantially free from food stains.

In view of the substantial differences between a meat and vegetables in response to elevated temperatures and moisture, the combining of the two materials can result in an undesirable product. Both the meat and vegetables must be cooked, so as to have the appropriate consistency. The flavor of the stick will be a result of the flavors of the meat and the vegetables, and the flavors must combine to give a pleasant experience to the palate. The moisture content of the stick must permit each of the constituents to have an appropriate texture. The stick should retain its structure or integrity on storage, so that an unsightly precipitate or breakdown of the stick does not occur and the stick is readily removed from the container and can be eaten while retaining its form.

In order to obtain a product which is organoleptically and commercially acceptable, the manner of processing becomes quite important. The particular form or state of meat and vegetable source will affect the nature of the final product. Processing will also affect the palatability and physical properties of the stick. There is also a consideration of the economics of the process. And, finally, the storage stability and form retention will be a function of the manner in which the stick is formed, as well as the materials employed in forming the stick.

2. Description of the Prior Art

U.S. Patents of interest include U.S. Pat. Nos. 3,083,108, 3,114,639, 3,309,207, 3,486,910, 3,617,307, and 3,713,837.

SUMMARY OF THE INVENTION

A palatable meat and vegetable combination stick is provided of a desirable consistency and stability. Raw meat is ground, dry ingredients other than the vegetables added, and the mixture blended with a portion of the total water added during the process. After blending for a sufficient time, the mixture is minced at moderate temperatures providing emulsification of the meat. The minced meat is then blended with the remainder of the water, and dehydrated vegetable chunks. After stuffing the mixture into a casing, the mixture is smoked and cooked under controlled temperature and moisture conditions. The casing is removed, the content of the casing linked or cut into sticks, and the sticks are then packaged, usually in a broth or a water media.

DESCRIPTION OF THE SPECIFIC EMBODIMENTS

Meat sticks are provided having a combination of meat and vegetables of a desirable consistency and palatability. The process employs raw meat and dehydrated vegetables pieces. The process provides ease of processing and handling, enhanced yields due to retention of moisture, rehydration during the processing, and a final product which retains its structural integrity in a broth or water media.

In carrying out the process, the raw meat is ground to a desired size and consistency. If frozen meat is employed, the temperature is raised above freezing, dry ingredients added other than the vegetables, such as spices, emulsifiers, food supplements, antioxidants, and the like, and the mixture blended to obtain the desired homogeneity. The mixture is then minced, resulting in emulsification of the meat.

The emulsified meat composition is then combined, preferably in an amount of from 51 to 60 weight percent of total ingredients, with the dehydrated vegetables, preferably in an amount of from 8 to 15 weight percent of the total ingredients, the preferred amount of from 25 to 45 weight percent of the total ingredients of water added, and the mixture blended with or without a mild vacuum. The substantially homogeneous mixture is then stuffed into an inert tubular casing and smoked and cooked under controlled temperature and moisture conditions. After the desired degree of protein coagulation in smoking and cooking has occurred, the casing is removed and the tubular shaped composition cut or linked to the desired size, sterilized and packaged in a broth medium.

Various types of meats may be employed, either individually or in combination, preferably in combination. For purposes of this invention, the term "meat" is intended to include beef (including veal), pork, lamb, mutton, poultry, e.g. chicken and turkey, or the like. For reasons of economy, storage and handling, the meat will normally be obtained frozen, but fresh meats may be used. In this condition, the meat further serves to maintain the initial processing steps at moderately low temperatures. When frozen, the meat will first be processed in an extructor and ground or comminuted into relatively coarse pieces. Conveniently, the meat may be ground and extruded through openings of about one-fourth to one-half inch, more usually about three-eighths inch.

After grinding the meat, it is desirable to have the meat at a temperature of at least above freezing, usually above 30° F and below about 34° F. If necessary, small amounts of hot water may be added to raise the temperature to the desired temperature.

To the meat is now added the various dry ingredients other than the vegetables. For example, protein additives and extenders such as cottonseed flour, soya flour, soy concentrate, soya isolate, yeast and the like can be utilized. Additional ingredients can include from 0.5 to 1.5 weight percent of total ingredients of hydrolized vegetable protein, spices, such as from 1 to 2 weight percent of total ingredients of salt, sugar, garlic, pepper and the like, emulsifiers, e.g., lecithin, tenderizers, e.g. monosodium glutamate, anti-oxidants, stabilizers, colorants or dyes, food supplements, e.g. vitamins, from 3 to 5 weight percent of total ingredients of binder, or other physiologically acceptable food additives. Normally, a minor amount of the total amount of water to be added during the process, will be included at this processing step. Usually, at least 5% of the total water, and more usually from about 10% to 20% of the total water, preferably from about 10% to about 15% of the total water is added. The mixture is blended in a conventional blender for a short time to obtain the desired homogeneity of the mixture.

The substanitally homogeneous mixture is now minced, so as to substantially reduce the particulate size and emulsify the meat composition. Mincing can be carried out by forcing the composition through orifices below about 5mm in diameter. Conveniently, a two step operation can be employed, employing initially a plate having orifices of about 2.5mm, followed by employing a plate having orifices of about 1.7mm. The size of the orifice will generally vary in the range of about 1mm to 5mm, more usually from about 1.5mm to 3mm. During the mincing operation, moderate temperature should be maintained, preferably the temperature should not exceed about 55° F.

The finely ground emulsified meat composition is then blended with dehydrated vegetable chunks and the balance of the water. Various vegetables may be employed, such as potatoes, carrots, peas, onions, corn, squash, celery, parsley, green beans, peppers, pimiento, cabbage, chives, horseradish, or the like.

The particle size for the vegetables will generally range from about U.S.S. No. 5 to No. 50, more usually from about U.S.S. No. 6 to No. 40. That is, greater than 80 weight percent, more usually greater than about 90 weight percent of the vegetable particles will pass through the larger openings and be retained by the sieve having the smaller openings. The moisture content of the particles (Method C-1.41) will generally be less than 15 weight percent, preferably less than about 12 weight percent and usually greater than about 5 weight percent.

The emulsified meat, vegetable particles, and the remainder of the water are combined and blended to substantial homogeneity under a mild vacuum, usually about 3 to 6 inches Hg. The vacuum removes air pockets and provides for greater condensation of the mass for introduction into the casing.

The meat and vegetable composition is now stuffed into an inert casing, conveniently a nonedible transparent cellulose casing, although other casings may also be employed, as desired. The significant factors concerning the casing are that it does not impart any undesirable flavor or materials to the food contained therein and is able to withstand the processing conditions.

The casing is conveniently of about 10 to 20 mm in diameter, more usually from about 14mm to 20mm in diameter. The casing may be of any convenient length, the length usually exceeding about 50 inches.

The casing may now be smoked and cooked under carefully controlled conditions of temperature and moisture content. The temperature will normally be raised stepwise to a temperature not exceeding 190° F, preferably not exceeding 180° F. During the processing, the wet bulb temperature will generally lag from about 20° to 40° behind the dry bulb temperature, more usually 20° to 30° F behind the dry bulb temperature. The cooking temperature will usually be initiated at about 110° F and raised therefrom to the final temperature.

The total cooking time will generally be in the range of about 45 minutes to 2 hours, more usually from 1 to 1.5 hours. Conventional liquid smoke may be employed to impart the desired smoke flavor to the food (except poultry items). Conveniently, 1 to 2 ounces of liquid smoke may be employed for 100 lbs. of product. The treatment with the liquid smoke will generally range from about 5 to 15 minutes, preferably about 10 minutes.

After the meat and vegetable composition has been satisfactorily cooked to the desired tenderness and the vegetables substantially rehydrated, the tubular product is cooled, preferably below about 35° F, but usually not less than about 30° F.

The casing is now removed, and the casing contents linked or cut into sticks of the desired size. Convenient sizes will generally be about 2 to 4 inches, more usually from about 2 to 3 inches. The sticks are introduced into broth or water in a jar or other container, and subjected for a short period of time in a retort to a temperature above 210° F, and less than about 250° F. This completes the rehydration of the vegetables and any further cooking required for the meat.

The resulting sticks have a desirable consistency, being able to retain their structural integrity while stored in a broth or water media. Furthermore, they are highly palatable, with both the vegetables and meat having desirable organoleptic properties.

Of the total material added, there will normally be from about 45 to 70 weight percent, more usually from about 50 to 60 weight percent of meat, which may be an individual meat or a mixture of meats, particularly pork, beef, and poultry. The dehydrated vegetables will normally be added in from about 5 to 20 weight percent, and may be an individual vegetable or a mixture of vegetables, particularly sweet potatoes, white potatoes, carrots, peas and celery.

The water added during the processing will generally be from about 25 to 35 weight percent, more usually from about 28 to 33 weight percent of the total material added. Finally, the minor other ingredients such as spices, salt, emulsifiers, antioxidants, stabilizers or the like, will generally range from about 0.1 to 5 weight percent, more usually from about 0.1 to 4 weight percent. Spices (other than salt) in their entirety, will generally range from 0.1 to 0.3 weight percent. Other additives will range from about 1 to 4 weight percent.

The following example is offered by way of illustration and not by way of limitation.

(All temperatures not otherwise indicated are in Fahrenheit.)

The following table indicates the materials employed in the process:

TABLE I

| Meat | lbs. |
|---|---|
| Beef | 25.01 |
| Pork | 22.90 |
| Turkey | 6.00 |
| Vegetables | |
| Potato granules[1] | 5.00 |
| Carrot granules[2] | 2.50 |
| Peas crushed[3] | 2.00 |
| Water | 30.39 |
| Salt | 1.50 |
| Ca Reduced dry skim milk | 3.50 |
| Hydrolized vegetable protein | |

TABLE I-Continued

| Meat | lbs. |
|---|---|
| protein | 1.00 |
| Spices | 0.20 |
| 1. Particle size | |
| on U.S.S. No. 6 | 1% max |
| on U.S.S. No. 20 | 70% min |
| thru U.S.S. No. 40 | 3% max |
| Moisture (C-1.41) | 7-9% |
| 2. Particle size | |
| on U.S.S. No. 6 | 0% max |
| on U.S.S. No. 8 | 10% max |
| thru U.S.S. No. 40 | 5% max |
| 3. Moisture | 5% max |

The process was carried out as follows.

The frozen meat was ground through ⅜ inch orifices. After grinding, the temperature was checked to insure that the meat was at least at 35° F. and water added as required. The dry ingredients other than the vegetables were then added, and about 10 to 15 weight percent of the total water to be added introduced and the mixture blended for about 6 minutes. The comminuted meat composition was then transferred to a Mince Master and minced first through a 2.5mm plate, followed by mincing through a 1.7mm plate. During the process, the temperature is maintained below about 55° F.

The minced meat composition was then transferred to a blender, the potatoes, carrots, peas and balance of water added and the mixture mixed for 5 minutes under a 5 inch vacuum (vacuum may be omitted). The substantially homogeneous meat-vegetable composition was then stuffed into a conventional nonedible cellulose casing of about 15–17mm diameter and 95 inches long.

A smoke house equipped for liquid smoke use was preheated to 110° F with the dampers open. The meat links were introduced into the smoke house, the dampers closed, and the liquid smoke atomized and held for 10 minutes. About 1.5 ounces of liquid smoke was employed per 100 lbs of product.

The following heat and moisture schedule was then followed:

TABLE II

| Time min. | Temp., °F. Dry Bulb | Wet Bulb | Dampers |
|---|---|---|---|
| 5 | 120 | | closed |
| 20 | 130 | 110 | closed |
| 30 | 140 | 120 | ¾ open |
| 10 | 155 | 130 | ¾ open |
| 5 | 170 | 150 | ¼ open |

After the cycle of heating was concluded, the links were cooled with water by showering to 90° F. After holding over night at 30° F, the casing was peeled and the tubes cut into 2 ¼ inch sticks. Seven sticks were packed in a jar and broth having 0.74 weight percent protein was introduced into the jar to allow for 10/32 inch head space. The jars were retorted for 40 min at 240° F, (IT-80 to 120°F).

The following chicken and vegetable formulation, as set forth in Table III, was employed in the preceding process with substantially similar results:

TABLE III

| Chicken and Vegetables | lbs. |
|---|---|
| Chicken | 53.00 |
| Water | 30.95 |
| Potato granules | 5.00 |
| Calcium reduced D.S.M. | 3.50 |
| Carrot granules | 2.50 |
| Peas — split | 2.00 |
| Salt | 1.50 |
| Hydrolized vegetable protein | 1.00 |
| Spices | 0.30 |
| Celery | 0.25 |
| | 100.00 |

Packed in water or packed in chicken broth containing a minimum of 0.74% protein.

The resulting meat and vegetable sticks have desired uniform consistency and are highly palatable. The sticks provide a convenient source of a high protein food in edible form which can be desirably eaten by juniors with their hands. The subject process provides easy processing and handling, retains the moisture content of the food, giving the sticks a desirable texture, and provides for completion of rehydration during the cooking of the meat and sterilization. Upon storage in water or broth, the meat sticks retain their consistency and structural integrity, so as to minimize or totally avoid the presence of an unsightly precipitate at the bottom of the container.

Although the foregoing invention has been described in some detail by way of illustration and example for purposes of clarity of understanding, it will be obvious that certain changes and modifications may be practiced within the scope of the appended claims.

What is claimed is:

1. A method for preparing palatable meat and vegetable sticks of uniform consistency and structural integrity wherein subsequent particle precipitation from the sticks is minimized, comprising:

combining small meat chunks, a minor amount of at least one dry food additive selected from protein additives and extenders, hydrolyzed vegetable protein, spices, emulsifiers, tenderizers, anti-oxidants, stabilizers, colorants or dyes, food supplements, vitamins and binders, and at least 5 weight percent of the total water, added at a temperature in the range of about 35° to 55° F;

mincing said combined meat chunks at a temperature below about 55° F;

adding dehydrated vegetables and the remainder of the water and blending to form a meat-vegetable composition;

stuffing said meat-vegetable composition in an inert casing and coagulating said encased meat-vegetable composition at a temperature below about 190° F and under moisture conditions to substantially maintain the moisture content of said meat-vegetable composition;

cooling said meat-vegetable composition;

removing said casing and dividing said cooled composition into sticks of desired size;

introducing said meat-vegetable composition into an aqueous medium and sterilizing said meat-vegetable composition, the ingredients added during the method being in the following weight percent of the total ingredients:

| | |
|---|---|
| meat | 45–70 |
| vegetable | 5–20 |
| water | 25–45. |

2. A method according to claim 1, wherein said blending is accomplished under mild vacuum of about 3–6 inch mercury.

3. A method according to claim 1, wherein the ingredients added during the process are in the following weight percent of the total ingredients:

| | |
|---|---|
| meat | 51–60 |
| vegetables | 8–15 |
| water | 28–33 |
| binder | 3–5 |
| salt | 1–2 |
| hydrolized vegetable protein | 0.5–1.5 |
| spices | 0.1–0.3 |

4. A method according to claim 1, wherein the amount of water combined with said meat chunks is from about 5 to 20% of the total water.

5. A method according to claim 4, wherein said meat-vegetable composition is subjected to liquid smoke and cooked by raising the temperature stepwise and maintaining the moisture content about said composition as measured by a wet bulb at about 20° to 40° F lower than the cooking temperature.

6. A method according to claim 1, wherein said minced, combined meat chunks are emulsified prior to addition of the dehydrated vegetables.

7. A method according to claim 1 wherein said meat is poultry.

8. A product made in accordance with the process of claim 1.

* * * * *